(12) United States Patent
Hirai

(10) Patent No.: US 7,026,608 B2
(45) Date of Patent: Apr. 11, 2006

(54) GAIN CORRECTION OF IMAGE SIGNAL AND CALIBRATION FOR GAIN CORRECTION

(75) Inventor: Akira Hirai, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 231 days.

(21) Appl. No.: 10/396,078

(22) Filed: Mar. 25, 2003

(65) Prior Publication Data

US 2003/0183771 A1    Oct. 2, 2003

(30) Foreign Application Priority Data

Mar. 27, 2002    (JP)    .............................. 2002-089765

(51) Int. Cl.
*G06K 9/38* (2006.01)
*H05G 1/64* (2006.01)
*G01D 18/00* (2006.01)
*G12B 13/00* (2006.01)
*H01L 27/146* (2006.01)
*G01T 1/24* (2006.01)
*G01T 1/20* (2006.01)

(52) U.S. Cl. .............................. 250/252.1; 250/370.09; 250/370.11; 378/98.8; 382/132; 382/270

(58) Field of Classification Search ................................
250/370.08–370.09, 252.1, 339.09, 363.09,
250/363.07; 702/87; 382/276, 312, 132,
382/270; 378/207, 98.2, 98.7, 98.8
See application file for complete search history.

(56) References Cited

U.S. PATENT DOCUMENTS

| 5,047,861 | A  | * | 9/1991  | Houchin et al. ............ 348/247 |
| 6,018,563 | A  | * | 1/2000  | Arai et al. ..................... 378/39 |
| 6,219,405 | B1 | * | 4/2001  | Inoue ........................ 378/98.8 |
| 6,265,720 | B1 | * | 7/2001  | Yamazaki et al. ..... 250/370.09 |
| 6,333,963 | B1 | * | 12/2001 | Kaifu et al. ................. 378/98.2 |
| 6,350,985 | B1 | * | 2/2002  | Rodricks et al. ......... 250/252.1 |
| 6,393,098 | B1 | * | 5/2002  | Albagli ...................... 378/98.2 |
| 6,559,450 | B1 | * | 5/2003  | Berlad et al. .......... 250/363.07 |
| 6,763,084 | B1 | * | 7/2004  | Boehm et al. ................ 378/62 |
| 6,819,786 | B1 | * | 11/2004 | Hirai ......................... 382/132 |

FOREIGN PATENT DOCUMENTS

| EP | 0 855 678 A2 | 7/1998 |
| EP | 0 881 828 A2 | 12/1998 |
| JP | 9-73144 | 3/1997 |
| JP | 9-321267 | 12/1997 |

* cited by examiner

*Primary Examiner*—David Porta
*Assistant Examiner*—Frederick F. Rosenberger
(74) *Attorney, Agent, or Firm*—Morgan & Finnegan, LLP

(57) ABSTRACT

The gain difference between pixels is to be corrected for an image signal obtained by an image sensing element having a plurality of pixels. The first reference image is sensed without any object, and then an object is sensed. Gain correction is performed for the sensed object image by using the first reference image. To perform gain correction again, the second reference image is sensed without any object. Gain re-correction is performed for the object image having undergone gain correction by using the first and second reference images.

5 Claims, 7 Drawing Sheets

GAIN CORRECTION OF IMAGE SIGNAL AND CALIBRATION FOR GAIN CORRECTION

FIELD OF THE INVENTION

The present invention relates to gain correction of a sensed image and calibration for gain correction.

BACKGROUND OF THE INVENTION

A method of irradiating an object with radiation, detecting the intensity distribution of radiation having passed through the object, and obtaining the radiological image of the target has widely been used in industrial nondestructive inspection and medical diagnosis. Recently, a digital radiographic apparatus using a two-dimensional image sensing element is also developed, as disclosed in Japanese Patent Laid-Open Nos. 09-321267 and 09-073144.

In the digital radiographic apparatus using an image sensing element, the gains of pixels are not uniform, and gain correction for each pixel is necessary to obtain a proper output image from an image formed on the image sensing element. Gain correction image sensing is called calibration, which is generally executed by the user at a predetermined interval. In calibration, the entire effective image sensing region is irradiated with radiation in the absence of any object to be sensed. The sensed image (to be referred to as a "gain image", hereinafter) is stored, and gain variations in a clinical image sensed for diagnosis are corrected using the gain image. In this case, irradiation nonuniformity of the radiation tube lamp and transmission nonuniformity of grid and the phototimer can also be corrected at the same time as correction of gain variations in pixels. A more accurate image than an analog radiograph can be acquired.

However, the gain distribution characteristic of the radiographic apparatus is not invariant. For example, when the radiation quality changes due to the difference in tube voltage, the shadow of the phototimer or grid may be sensed. The degree of variations between pixels may change due to the difference in the ambient temperature of the image sensing element, and the internal structure or driving structure of the radiographic apparatus may be seen. Shading by cut-off of the grid may be emphasized, or the edge of the phototimer may be slightly sensed owing to the difference in the incident angle of radiation. Such phenomenon degrades the suitability of an output image, and further generates a processing error in image processing which helps to diagnose an image, outputting an image not suitable for image diagnosis.

To prevent this, calibration is desirably performed after conditions for sensing an object image are determined. Calibration generally executes image sensing a plurality of number of times, which is cumbersome to the user. It is not practical to perform calibration for every image sensing. From this, generally, calibration is periodically executed and the latest gain image is used for correction.

A large difference between image sensing conditions in calibration image sensing and image sensing conditions in actual object image sensing may generate an artifact. The user is recommended to periodically perform calibration without determining whether calibration is necessary. As a result, an effective gain image may not be efficiently acquired.

SUMMARY OF THE INVENTION

The present invention has been made in consideration of the above situation, and has as its object to prevent degradation of the image quality caused by the difference in image sensing conditions between preceding calibration and object image sensing.

It is another object of the present invention to realize efficient use of calibration by determining whether re-collection of a gain image is necessary.

According to the present invention, the foregoing object is attained by providing an image processing method of correcting a gain difference between pixels for an image signal obtained by an image sensing element having a plurality of pixels, comprising; sensing a first reference image without any object; sensing an object; performing gain correction for a sensed object image by using the first reference image and determining whether to perform gain correction again; when gain correction is to be performed again, sensing a second reference image without any object; and performing gain re-correction for the object image having undergone gain correction by using the first and second reference images.

According to the present invention, the foregoing object is attained by providing an image sensing apparatus comprising; an image sensing element having a plurality of pixels; a gain correction unit adapted to correct a gain difference between pixels for an image signal of an object image obtained by sensing an object by the image sensing element using a first reference image sensed without any object; a determination unit adapted to determine whether to perform gain correction again; and a gain re-correction unit adapted to, when the determination unit determines to perform gain correction again, sense a second reference image by the image sensing element without any object, and perform gain re-correction for the object image having undergone gain correction by the gain correction unit using the first and second reference images.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
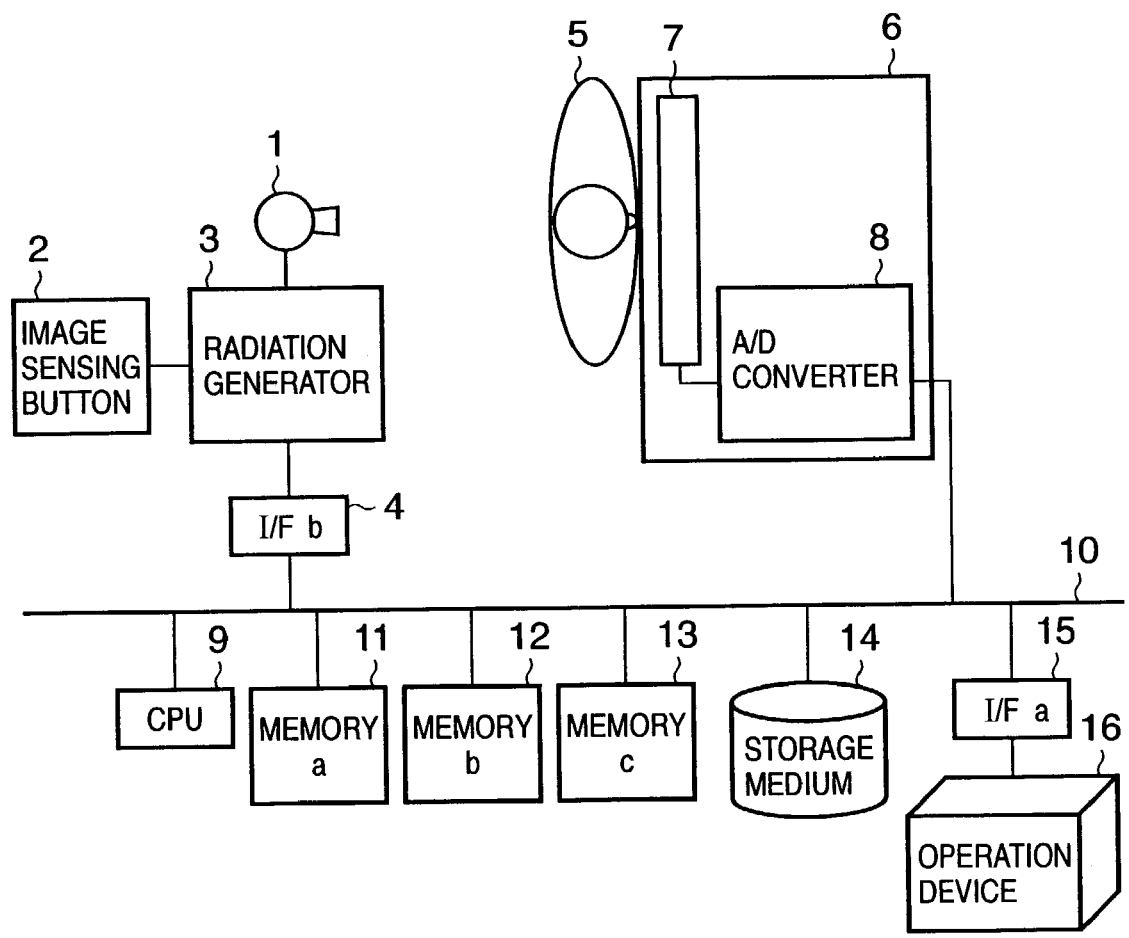
FIG. 1 is a block diagram showing the structural concept of a radiographic apparatus according to the first embodiment of the present invention.

FIG. 1 is a block diagram showing the structural concept of a radiographic apparatus according to the first embodiment of the present invention. In general, gain correction is performed using a gain image obtained by calibration executed in advance. In the first embodiment, a gain re-correction mode is provided to allow re-collection of a gain image and re-correction using the image as needed. Further, a calibration necessity/non-necessity determination mode is provided, and whether to perform calibration is automatically determined.

Figure 2:
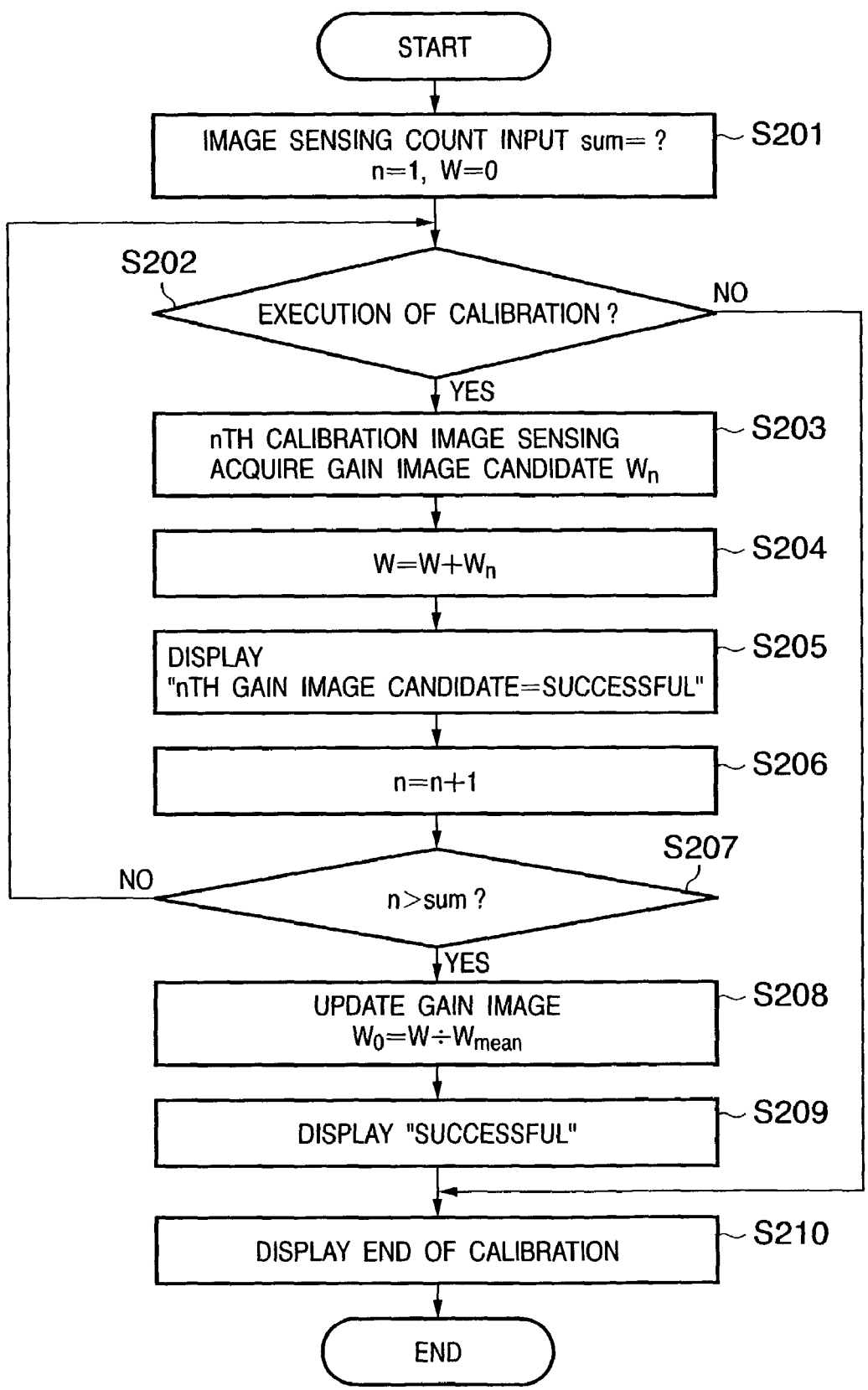
FIG. 2 is a flow chart showing the flow of a general calibration image acquiring method.
Figure 3:
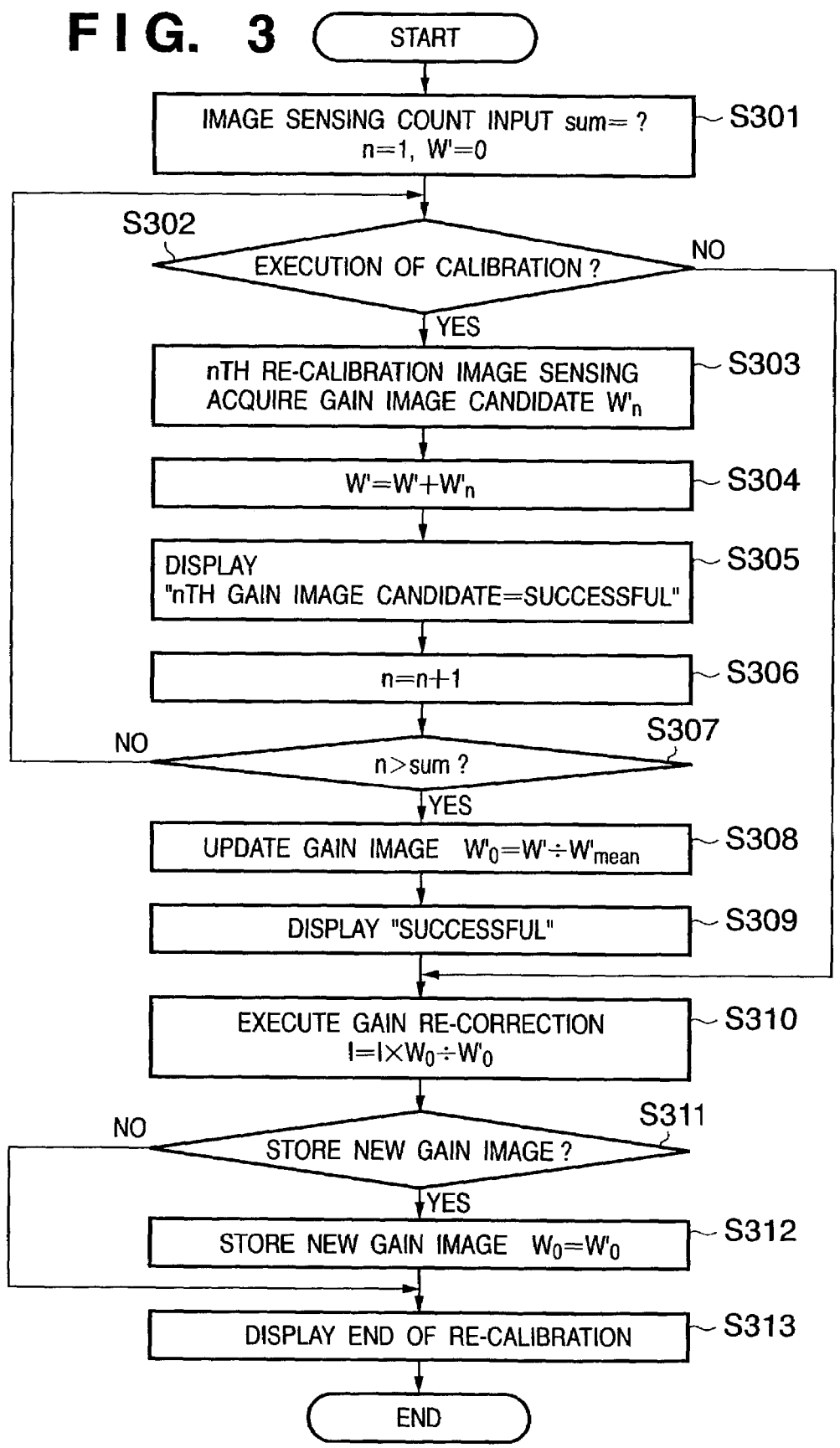
FIG. 3 is a flow chart showing the flow of gain re-correction processing according to the first embodiment of the present invention.
Figure 4:
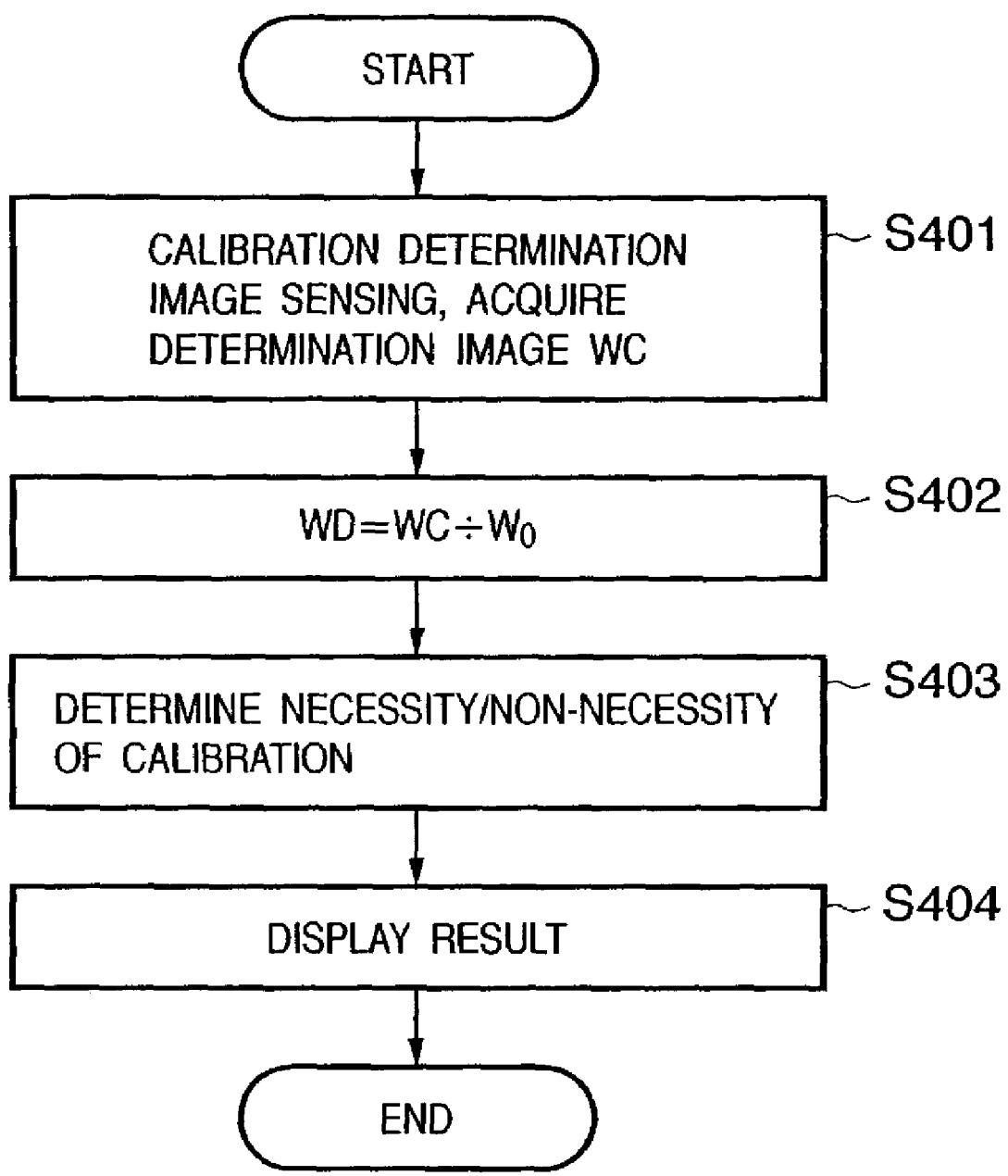
FIG. 4 is a flow chart showing the flow of a calibration necessity/non-necessity determination function and resultant warning display function according to the first embodiment of the present invention.

FIG. 2 is a flow chart showing a general calibration image acquiring method in the radiographic apparatus according to the first embodiment. FIG. 3 is a flow chart showing gain re-correction processing in the gain re-correction mode. FIG. 4 is a flow chart showing operation in the calibration necessity/non-necessity determination mode.

The arrangement of the radiographic apparatus according to the first embodiment will be explained with reference to FIG. 1. Reference numeral 9 denotes a central processing unit which manages the whole control and calculation; 10, a bus which connects internal devices; and 6, an image sensing unit which comprises a radiation detector 7 and A/D converter 8. The radiation detector 7 comprises, e.g., a driving controller, and a unit obtained by arranging a phosphor on the front surface of a photodetector including amorphous silicon and a TFT. The A/D converter 8 is connected to the bus 10 and can communicate a signal. The bus 10 is connected to a memory a 11, memory b 12, and memory c 13. The memory a 11 stores a program for controlling this apparatus, and this program can be used to perform image calculation. The memory b 12 is used to store a digital image signal output from the A/D converter 8. The memory c 13 is used to store a gain image obtained by calibration.

The bus 10 is also connected via an interface device a 15 to a storage medium 14 for saving an image having undergone calculation, and an operation device 16 which allows the user to operate the apparatus while seeing the screen. The bus 10 is further connected to a radiation generator 3 via an interface device b 4, and the radiation generator 3 is connected to a radiation tube lamp 1 and image sensing button 2. The operation principle of the radiographic apparatus will be explained.

The operator aligns an object 5 to be sensed on the image sensing unit 6. The operator presses the image sensing button 2 to request image sensing by the central processing unit 9. The central processing unit 9 controls and initializes the radiation detector 7, then controls the radiation generator 3, and generates radiation from the radiation tube lamp 1. Radiation is emitted from the tube lamp 1, and irradiates the image sensing unit 6 at a transmission radiation intensity corresponding to the structure of the object 5. The radiation detector 7 two-dimensionally photoelectrically converts the image in accordance with a received two-dimensional radiation intensity, and transmits an analog image signal to the A/D converter 8. The A/D converter 8 converts the received analog signal into a digital signal, and the digital image signal is stored in the memory b 12. The CPU 9 reads out the image signal from the memory b 12 and a gain image stored in advance in the memory c 13, and executes gain correction calculation in accordance with a program stored in the memory a 11. Gain correction calculation is $I = I\text{row} \div W_0$ (I: final output image, Irow: raw image of an object, $W_0$: gain image)

A final output image having undergone gain correction calculation is saved in the storage medium 14, ending image sensing. The operator reads out a corrected image from the storage medium 14 in accordance with his/her purpose of use, and transmits the image to a diagnostic monitor.

The general calibration image acquiring method will be described with reference to the flow chart shown in FIG. 2. The following gain image generation processing is executed when the user operates the operation device 16 and the operation mode of the radiographic apparatus is set to the calibration mode.

When the operation mode changes to the calibration mode, the CPU 9 inquires the calibration count of the user using, e.g., the display function of the operation device 16, and substitutes the input result into "sum". At the same time, the CPU 9 clears the signal of a total gain image W to 0 over the entire area, and resets a counter n representing the count to 1 (step S201). The reason of causing the user to select the image sensing count is as follows. As the image sensing count increases, the user feels more cumbersome. However, a larger image sensing count increases the S/N ratio of the gain image and improves the image quality of a final output image. The count can therefore be changed by the user's desire.

The CPU 9 inquires of the user whether to continue execution of calibration (step S202). For example, the CPU 9 causes the user to select "perform calibration" or "not perform calibration" by using the display and input functions of the operation device 16. If "not perform calibration" is selected by a user, the CPU 9 executes processing in step S210 to be described later; if "perform calibration" is selected, the CPU 9 executes processing in the next step.

If the user selects "perform calibration" in step S202, the CPU 9 controls the radiation detector 7 so as to change it to a calibration image sensible state, i.e., an image sensible state without the object 5. After recognizing that the radiation detector 7 changes to an image sensible state (ready), the CPU 9 displays a message to this effect by the display function of the operation device 16, and waits for a calibration image sensing start instruction from the user. If the user issues a calibration image sensing instruction, the CPU 9 performs a series of operations described with reference to FIG. 1, and acquires a gain image candidate $W_n$ (step S203).

The CPU 9 calculates $W = W + W_n$ (step S204), and uses the display function of the operation device 16 to notify the user that the nth gain image candidate is successfully obtained (step S205). The CPU 9 calculates n=n+1 to count up the image sensing counter (step S206).

The CPU 9 compares n with sum, and determines whether to keep acquiring a gain correction candidate image (step S207). If n is equal to or smaller than sum, the CPU 9 executes step S202. If NO in step S207, the CPU 9 executes the next processing in step S208.

The CPU 9 updates a gain image $W_0$ stored in the memory c 13 by a gain image $W_0$ obtained by the current calibration (step S208). More specifically, the CPU 9 divides the total gain image W by the mean pixel value (Wmean) of the total gain image W to normalize the total gain image W, acquiring a gain image $W_0$ (=W÷Wmean). The CPU 9 stores the gain image $W_0$ in the memory c 13. The mean calculation region for calculating a mean pixel value (Wmean) may be the entire image region or a partial region set in advance.

The CPU 9 uses the display function of the operation device 16 to notify the user that calibration is successful (step S209). After processing in step S209 or if the user selects "not perform calibration" in determination in step S202 described above, the CPU 9 uses the display function of the operation device 16 to display a message representing the end of calibration (step S210). Accordingly, the radiographic apparatus exits from the calibration mode into a state wherein general image sensing (image sensing of the object 5) can be performed.

The flow of general image sensing and general calibration has been described. When object image sensing conditions are different from calibration conditions and proper gain correction is not performed, re-collection of a gain image and re-correction using the re-collected gain image can be executed in the gain re-correction mode. Operation in the gain re-correction mode will be explained with reference to the flow chart shown in FIG. 3.

The following gain image re-generation processing and gain re-correction processing are executed when an object is sensed, general gain correction is performed to save and output the image, and the user operates the operation device 16 to set the operation mode of the radiographic apparatus to the gain re-correction mode.

Processes in steps S301 to S309 are the same as those in steps S201 to S209 in the calibration mode shown in FIG. 2, and a description thereof will be omitted. Note that a re-collected gain image is represented by $W'_0$, and distinguished from the gain image $W_0$ acquired in advance.

The CPU 9 uses the previously obtained gain image $W_0$ and re-collection total gain image $W'_0$ to perform gain re-correction for an object-sensed image I to be corrected again (step S310). The CPU 9 overwrites the re-corrected image in the storage medium 14. More specifically, the CPU 9 reads out the gain image $W_0$ stored in the memory c 13, and executes $$I = I \times W_0 \div W'_0$$

In other words, the CPU 9 uses the gain image $W_0$ to perform reverse correction processing for a temporarily gain-corrected image, thus returning the image to an original image. The CPU 9 uses the gain image $W'_0$ to execute gain re-correction processing. The re-corrected object image I is saved in the storage medium 14.

The CPU 9 uses the display and input functions of the operation device 16 to inquire of the user whether to update the gain image $W_0$ by the re-collected gain image $W'_0$ (step S311). Whether to update the gain image $W_0$ is inquired because there are two cases: a case wherein an image sensing condition for the image I is a special condition such as oblique incidence and the next image sensing is performed under the same condition as that of previous calibration image sensing; and a case wherein the gain characteristic of the radiographic apparatus changes upon a change in temperature or the like and subsequent image sensing uses the current gain image.

If the user selects "update", the CPU 9 executes step S312; if the user selects "not update", executes step S313.

The CPU 9 overwrites and stores $W'_0$ as $W_0$ in the memory c 13 (step S312). After processing in step S312, if the user selects "not perform calibration" in determination in step S302 described above, or if the user selects "not update" in step S311 described above, the CPU 9 uses the display function of the operation device 16 to display a message representing the end of gain re-correction (step S313).

The radiographic apparatus exits from the gain re-correction mode into a state wherein general image sensing (image sensing of the object 5) can be performed. Although the method of performing gain re-correction for a latest sensed image of an object has been described, gain re-correction can be performed for any object image as far as images in the storage medium 14 can be arbitrarily read out by the operation of the operation device 16.

A calibration necessity/non-necessity determination function and resultant warning display function will be explained with reference to the flow chart shown in FIG. 4. The following calibration necessity/non-necessity determination mode is executed when the operation mode of the radiographic apparatus is set to the calibration necessity/non-necessity determination mode.

The CPU 9 controls the radiation detector 7 so as to change it to an image sensible state, i.e., an image sensible state without the object 5. After recognizing that the radiation detector 7 changes to an image sensible state (ready), the CPU 9 displays a message to this effect by the display function of the operation device 16, and waits for a calibration image sensing start instruction from the user. If the user designates calibration image sensing, the CPU 9 performs a series of operations described with reference to FIG. 1, and acquires a calibration necessity/non-necessity determination image WC (step S401).

The CPU 9 reads out the gain image $W_0$ from the memory c 13, and performs the following calculation for the image WC acquired in step S401, obtaining a determination processed image WD (step S402):

$$WD = WC \div W_0$$

The CPU 9 calculates the feature of the determination processed image WD obtained in step S402, and determines whether execution of calibration is necessary or unnecessary (step S403). The feature can be calculated by various methods. For example, WD is divided into small blocks of 100 pixels×100 pixels, and the feature is determined from the mean value Eij and standard deviation Sij of each block. In this case, ij represents the index of each block. More specifically, the feature is determined from a comparison between the mean value Eij and the mean value of eight peripheral blocks and a comparison between the standard deviation Sij and the mean value of standard deviation of the eight peripheral blocks. The mean value of the eight peripheral blocks is calculated by equation (1), and the mean value of the eight peripheral blocks regarding the standard deviation is calculated by equation (2):

$$\left\{ \sum_{x=i-1}^{i+1} \sum_{y=j-1}^{j+1} (Exy - Eij) \right\} \Big/ 8 \qquad (1)$$

$$\left\{ \sum_{x=i-1}^{i+1} \sum_{y=j-1}^{j+1} (Sxy - Sij) \right\} \Big/ 8 \qquad (2)$$

The necessity/non-necessity of calibration is determined by detecting variations in mean value or standard deviation caused by changes in gain distribution. A concrete comparison value depends on the S/N ratio of the apparatus. As for the mean value, variations of 1% or more are determined to be abnormal. As for the standard deviation, variations of three times or more in the mean value of the peripheral standard deviation are determined to be abnormal. The standard deviation may be compared with a preset threshold. In addition to this method, horizontally and vertically sectional shapes may be checked, frequency analysis may be performed to compare the spectrum peak with a preset threshold, or the histogram shape may be investigated.

The CPU 9 displays either "execution of calibration is necessary" or "execution of calibration is unnecessary" on the operation device 16 on the basis of the determination result calculated in step S403, and notifies the user of this (step S404). If "execution of calibration is necessary", the user designates calibration image sensing; if "execution of calibration is unnecessary", subsequent object image sensing is executed.

The operation of the radiographic apparatus according to the first embodiment has been described. In the first embodiment, the necessity/non-necessity of calibration is automatically determined. Alternatively, an image calculated in step S402 may be displayed to the user to cause the user to determine the necessity/non-necessity of calibration. In the above description, the necessity/non-necessity of calibration is determined by software, but may be determined by hardware in order to shorten the time.

Second Embodiment

Figure 5:
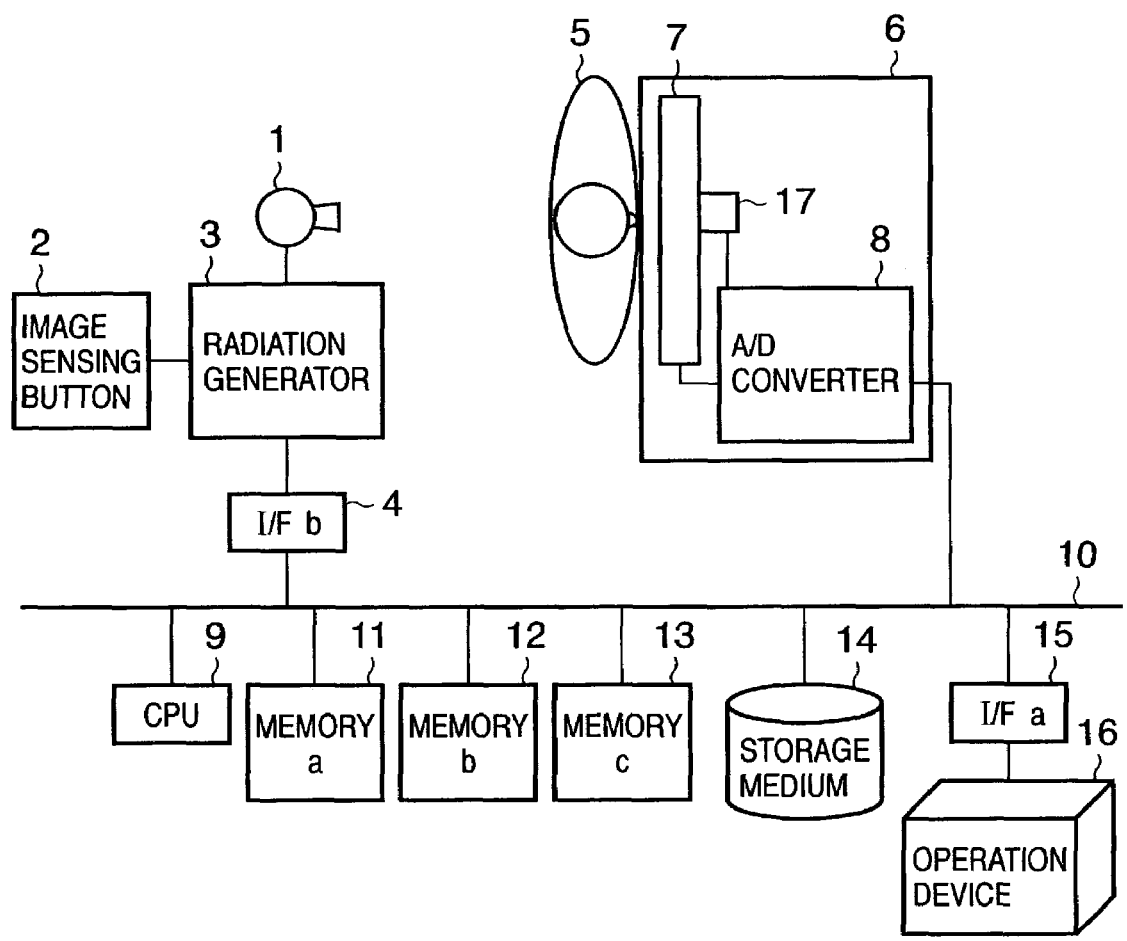
FIG. 5 is a block diagram showing the structural concept of a radiographic apparatus according to the second embodiment of the present invention.
Figure 6:
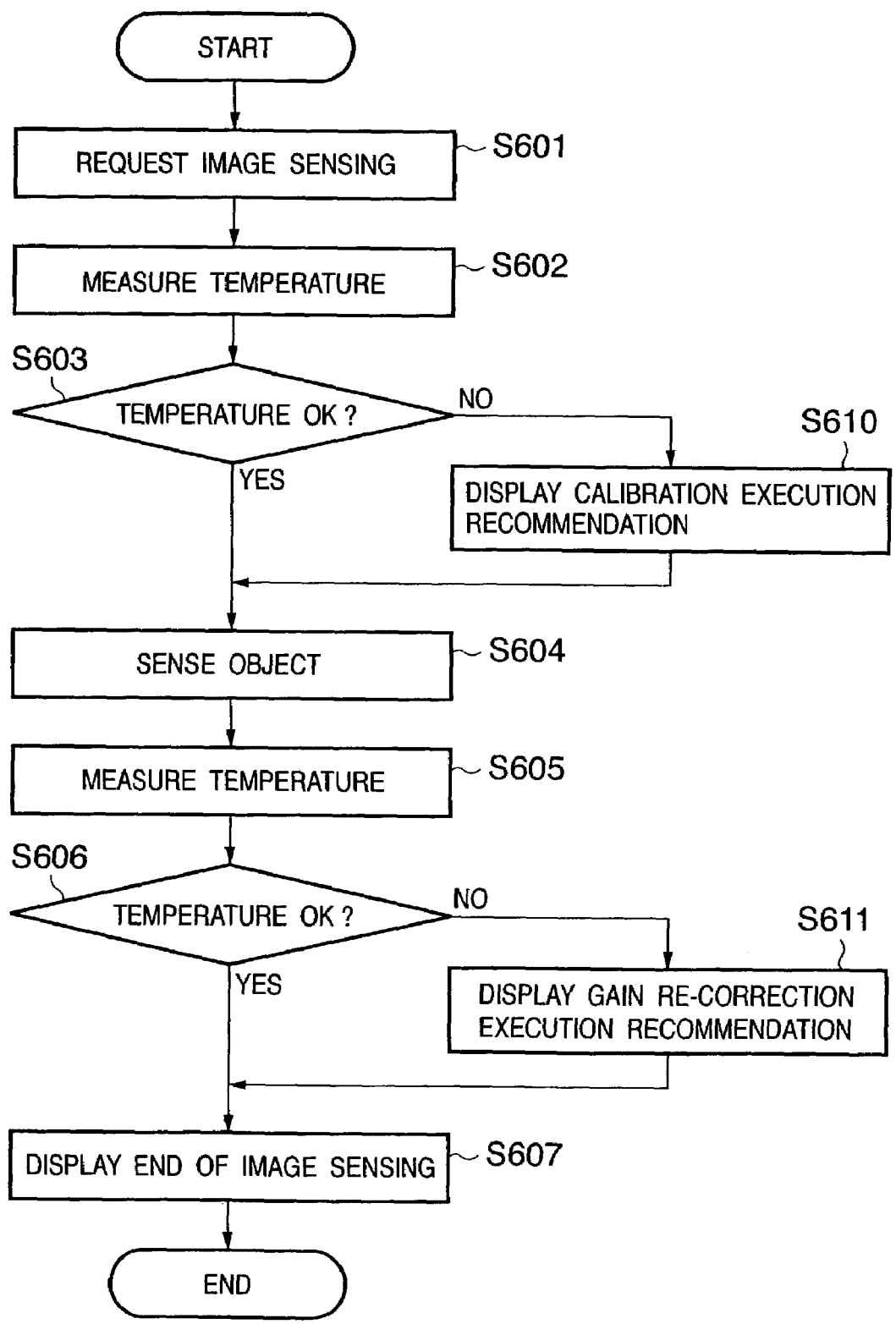
FIG. 6 is a flowchart showing "calibration execution recommendation" operation and "gain re-correction execution recommendation" operation by temperature measurement according to the second embodiment of the present invention.

FIG. 5 is a block diagram showing the structural concept of a radiographic apparatus according to the second embodiment of the present invention. FIG. 6 is a flow chart showing "calibration execution recommendation" operation and "gain re-correction execution recommendation" operation by temperature measurement according to the second embodiment.

The difference between the radiographic apparatus shown in FIG. 5 and the radiographic apparatus shown in FIG. 1 according to the first embodiment is only a thermometer 17 mounted in an image sensing unit 6. The remaining arrangement and the operation principle of image sensing are the same as those in the first embodiment, and a description thereof will be omitted. The radiographic apparatus in FIG. 5 can perform the flow chart operations shown in FIGS. 2, 3, and 4 described in the first embodiment, and a description of the operations will also be omitted.

The second embodiment is different from the first embodiment in that the temperature is measured upon reception of an object image sensing request, and if calibration is determined to be necessary based on the measured temperature, a calibration execution recommendation is generated, and in that the temperature is measured immediately after image sensing, and if gain re-correction is determined to be necessary based on the measured temperature, a gain re-correction execution recommendation is generated. The thermometer 17 is connected to an A/D converter 8. The thermometer 17 can measure the ambient temperature upon reception of a request from a CPU 9, and transmit the measurement result to the CPU 9.

"Calibration execution recommendation" operation and "gain re-correction execution recommendation" operation by temperature measurement in object image sensing according to the second embodiment will be explained with reference to the flow chart shown in FIG. 6. The CPU 9 requests temperature measurement of the thermometer 17 in calibration image sensing, and stores a replied measured temperature in a memory c 13. For descriptive convenience, let the temperature in calibration image sensing be Tcal.

If the user issues an object image sensing request by an operation device 16 (step S601), the CPU 9 requests temperature measurement of the thermometer 17, and the thermometer 17 transmits a temperature measurement result to the CPU 9 (step S602). For descriptive convenience, let the temperature upon reception of an object image sensing request be Timg1.

The CPU 9 compares Timg1 and Tcal and determines the necessity/non-necessity of calibration (step S603). For example, if |Timg1−Tcal|>Δ holds with respect to a preset threshold Δ, the CPU 9 determines that execution of calibration is necessary, and executes step S610 to be described later. If |Timg1−Tcal|≦Δ, the CPU 9 determines that execution of calibration is unnecessary, and executes the next step.

Then, the CPU 9 controls the radiographic apparatus and senses an object as described in detail in the first embodiment (step S604). The CPU 9 requests temperature measurement of the thermometer 17, and the thermometer 17 transmits the temperature measurement result to the CPU 9 (step S605). For descriptive convenience, let the temperature in object image sensing be Timg2.

The CPU 9 compares Timg2 and Tca1 and determines the necessity/non-necessity of calibration (step S606). For example, if |Timg2−Tcal|>Δ holds with respect to the preset threshold Δ, the CPU 9 determines that execution of gain re-correction is necessary, and executes step S611 to be described later. If |Timg2−Tcal|≦Δ, the CPU 9 determines that execution of gain re-correction is unnecessary, and executes the next step. The CPU 9 displays the end of image sensing on the operation device 16, and ends image sensing operation (step S607).

If the CPU 9 determines in step S603 that execution of calibration is necessary, the CPU 9 displays as a warning on the operation device 16 in step S610 a calibration execution recommendation, such as "Please execute calibration. The image quality is not assured." At this time, the radiographic apparatus may be forcibly shifted to the calibration mode. At the same time, the CPU 9 displays an "OK" button, and if recognizing that the user has clicked the "OK" button, executes step S604. To execute calibration, processing shown in FIG. 2 is performed.

If the CPU 9 determines in step S606 that execution of gain re-correction is necessary, the CPU 9 displays as a warning on the operation device 16 in step S611 a gain re-correction execution recommendation, such as "Please execute gain re-correction. The image quality is not assured." At this time, the radiographic apparatus may be forcibly shifted to the gain re-correction mode. At the same time, the CPU 9 displays an "OK" button, and if recognizing that the user has clicked the "OK" button, executes step S607. Note that gain re-correction processing is processing shown in FIG. 3.

The operation of the second embodiment has been described. The user instructs to execute calibration or gain re-correction in response to "calibration execution recommendation" or "gain re-correction execution recommendation", preventing degradation of the image quality.

Third Embodiment

The conceptual structure of a radiographic apparatus according to the third embodiment of the present invention is the same as that described in the first embodiment with reference to FIG. 1. Details of the operation are also the same, and a description thereof will be omitted. The third embodiment is different from the first embodiment in that execution of gain re-correction is recommended by determining the feature of an image generated every object image sensing. The radiographic apparatus according to the third embodiment can perform the flow chart operations shown in FIGS. 2, 3, and 4 described in the first embodiment, and a description of the operations will also be omitted.

Figure 7:
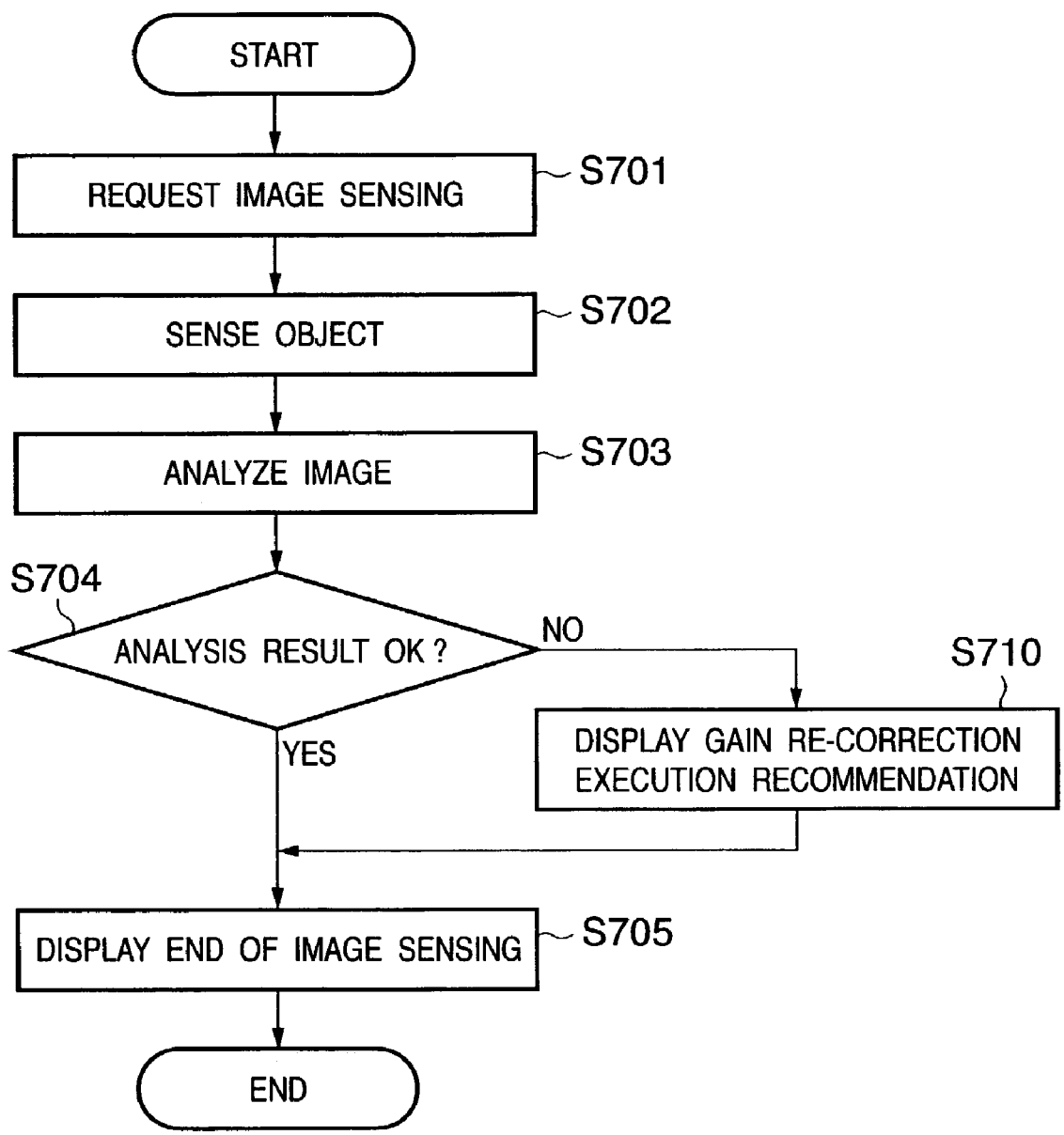
FIG. 7 is a flow chart showing gain re-correction execution recommendation operation by image analysis according to the third embodiment of the present invention.

FIG. 7 is a flow chart showing gain re-correction execution recommendation operation by image analysis according to the third embodiment of the present invention. "Gain re-correction execution recommendation" operation by image analysis in object image sensing according to the third embodiment will be explained with reference to the flow chart shown in FIG. 7.

If the user issues an object image sensing request by an operation device 16 (step S701), a CPU 9 controls the radiographic apparatus and senses an object in response to the image sensing request in step S701, as described in detail in the first embodiment (step S702).

The CPU 9 analyzes the image acquired in step S702 (step S703). Letting I be the image acquired in step S702, the CPU 9 generates a horizontally differentiated image Idh by horizontally shifting the image I by one pixel. The CPU 9 also generates a vertically differentiated image Idv by vertically shifting the image I by one pixel. The purpose of generating differentiated images is to reduce object information superimposed on the image to such a level as not to influence analysis. The CPU 9 performs frequency analysis for Idh, obtaining a spectrum peak Sp_h1. Further, the CPU 9 obtains a peak Sp_h2 of a profile prepared by vertically integrating Idh. The CPU 9 performs the same calculations for the vertically differentiated image Idv, obtaining a spectrum peak Sp_h3 and profile peak Sp_h4.

The CPU 9 determines the necessity of execution of gain re-correction by comparing the image feature values Sp_h1, Sp_h2, Sp_h3, and Sp_h4 obtained in step S703 with preset thresholds (step S704). If gain re-correction is determined to be necessary, the CPU 9 executes step S710; if unnecessary, executes the next step. The CPU 9 displays the end of image sensing on the operation device 16, ending image sensing operation (step S705).

If the CPU 9 determines in step S704 that execution of gain re-correction is necessary, the CPU 9 displays as a warning on the operation device 16 in step S710 a gain re-correction execution recommendation, such as "Please execute gain re-correction. The image quality is not assured." At this time, the radiographic apparatus may be forcibly shifted to the gain re-correction mode. At the same time, the CPU 9 displays an "OK" button, and if recognizing that the user has clicked the "OK" button, executes step S705. Note that gain re-correction processing is processing shown in FIG. 3.

The operation of the third embodiment has been described. The user instructs to execute gain re-correction in response to "gain re-correction execution recommendation", preventing degradation of the image quality.

As described above, the radiographic apparatus according to the third embodiment of the present invention can prevent degradation of the image quality caused by a gain correction error due to the difference in image sensing conditions between calibration image sensing and object image sensing. Moreover, the radiographic apparatus can execute gain re-correction to recover degradation of the image quality caused by a gain correction error due to the difference in image sensing conditions between calibration image sensing and object image sensing.

The present invention can realize efficient use of calibration by determining whether re-collection of an image without any object is necessary.

Note that the first to third embodiments have adopted in radiography such as X-ray image sensing. The present invention is not limited to this and can be applied to another type of image sensing apparatus, such as digital camera and digital video camera, which senses an image by converting light from an object to an electric signal.

Other Embodiment

The object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in FIGS. 2 to 4, or FIG. 6 and/or FIG. 7 in addition to FIGS. 2 to 4 of the embodiments.

The present invention is not limited to the above embodiments and various changes and modifications can be made within the spirit and scope of the present invention. Therefore to apprise the public of the scope of the present invention, the following claims are made.

What is claimed is:

1. An image processing method of correcting a gain difference between pixels for an image signal obtained by an image sensing element having a plurality of pixels, comprising:

sensing an object;

analyzing an object image obtained by said sensing of the object and determining whether or not sensing of a reference image is needed on the basis of a result of the analysis;

sensing the reference image without any object after sensing the object when it is determined that the sensing of the reference image is needed; and performing gain correction for the object image by using the reference image.

2. A computer readable program including instructions for controlling a processor to carry out the method of claim 1.

3. The image processing method according to claim 1, wherein, in said analyzing, frequency analysis of a differentiated image of the object image is performed.

4. An image sensing apparatus comprising:

an image sensing element having a plurality of pixels;

an analysis unit adapted to analyze an object image obtained by sensing an object by said image sensing element and determines whether or not sensing of a reference image is needed on the basis of a result of the analysis; and a gain correction unit adapted to perform gain correction for the object image using the reference image sensed without any object by said image sensing element when said analysis unit determines that the sensing of the reference image is needed.

5. The image sensing apparatus according to claim 4, wherein said analysis unit performs frequency analysis of a differentiated image of the object image.

* * * * *